(12) United States Patent
Flynn et al.

(10) Patent No.: US 7,175,821 B2
(45) Date of Patent: Feb. 13, 2007

(54) REACTOR AND PROCESS FOR REDUCING EMISSIONS OF CO AND $NO_x$

(75) Inventors: Harry E. Flynn, Edmond, OK (US); Lonnie G. Hewell, Guthrie, OK (US)

(73) Assignee: Tronox LLC, Oklahoma City, OK (US)

( * ) Notice: Subject to any disclaimer, the term of this patent is extended or adjusted under 35 U.S.C. 154(b) by 324 days.

(21) Appl. No.: 10/261,617

(22) Filed: Sep. 30, 2002

(65) Prior Publication Data
US 2004/0062698 A1  Apr. 1, 2004

(51) Int. Cl.
*B01D 53/56* (2006.01)
*B01D 53/86* (2006.01)
*B01J 8/00* (2006.01)
*C01B 21/00* (2006.01)

(52) U.S. Cl. ............... 423/239.1; 423/239.2; 423/210; 423/247; 423/244.02

(58) Field of Classification Search ........... 423/235, 423/237, 239.1, 239.2, 246, 247, 213.7, 244.01, 423/244.03; 502/400, 421, 20–56
See application file for complete search history.

(56) References Cited

U.S. PATENT DOCUMENTS

| | | | |
|---|---|---|---|
| 4,755,499 A | 7/1988 | Neal et al. | 502/415 |
| 4,940,569 A | 7/1990 | Neal et al. | 423/239 |
| 4,980,137 A * | 12/1990 | Nelson et al. | 423/239.1 |
| 5,096,680 A * | 3/1992 | Lindbauer et al. | 423/229 |
| 5,100,635 A * | 3/1992 | Krishnamurthy et al. | 423/235 |
| 5,315,824 A * | 5/1994 | Takeshima | 60/297 |
| 5,406,790 A * | 4/1995 | Hirota et al. | 60/276 |
| 5,451,558 A | 9/1995 | Campbell et al. | 502/325 |
| 5,650,127 A * | 7/1997 | Campbell et al. | 423/239.1 |
| 5,662,869 A * | 9/1997 | Abe et al. | 422/171 |
| 5,665,321 A * | 9/1997 | Campbell et al. | 423/210 |
| 5,746,989 A * | 5/1998 | Murachi et al. | 423/213.7 |
| 5,762,885 A | 6/1998 | Debbage et al. | 422/171 |
| 6,696,031 B1 * | 2/2004 | Twigg et al. | 423/212 |
| 6,863,874 B1 * | 3/2005 | Twigg | 423/210 |

OTHER PUBLICATIONS

Internet Web page article entitled "$SCONO_x$ ™ for $NO_x$, CO and VOC destruction", Goal Line Environmental Technologies LLC, published at www.glet.com, © 1998 (4 pp.).

(Continued)

*Primary Examiner*—Colleen P. Cooke
(74) *Attorney, Agent, or Firm*—McAfee & Taft

(57) ABSTRACT

The current invention provides systems and method for reducing emissions of gaseous pollutants such as carbon monoxide, nitric oxide and nitrogen dioxide. The invention utilizes at least one catalyst bed and at least one fluidizable bed of sorbent material. The current invention provides for regeneration of the sorbent material without interrupting the catalytic reaction.

19 Claims, 2 Drawing Sheets

OTHER PUBLICATIONS

Internet Web page article entitled "SCONO$_x$ ™ System Air Pollution Control System," Goal Line Environmental Technologies LLC, published at www.arb.gov, Aug. 31, 2001 (1 p.).

Internet Web page article entitled "SCONO$_x$ ™ Offers the Most Effective Emission Control Technology for Combined CO and NO$_x$ Abatement without the use of Ammonia," Goal Line Environmental Technologies LLC, published at www.arb.ca.gov, date of publication unknown (1 p.).

Internet Web page article entitled "Formation of Nitrogen Oxides in Industrial Gas Burners and Stationary Turbines," UCICL, published at ciee.ucop.edu, Jan. 27, 1999 (3 pp.).

Internet Web page article entitled "Nitrogen oxides," IPCS Environmental Health Criteria Series (No. 188), published at www.who.int, 1997 (34 pp.).

Abstract entitled "Evaluation of the Air Quality Performance Claims of Goal Line Environmental Technologies LLC SCONO$_x$ ™ System," California Environmental Protection Agency Air Resources Board, 24 pp. (Nov. 1998).

* cited by examiner

REACTOR AND PROCESS FOR REDUCING EMISSIONS OF CO AND $NO_X$

FIELD AND BACKGROUND OF THE INVENTION

The current invention provides a system for reducing emissions of gaseous pollutants. The system utilizes a fixed catalyst bed and a fluidizable sorbent bed to reduce emissions of carbon monoxide (CO), nitric oxide (NO) and nitrogen dioxide ($NO_2$). As used herein, the term "$NO_x$" refers to the sum of NO and $NO_2$ present in a gas.

Carbon monoxide and $NO_x$ are two of the five primary pollutants generated by the combustion of hydrocarbons. Additionally industrial processes, such as the manufacture of nitric acid and pigmentary titanium dioxide, contribute to the total $NO_x$ emissions. Emissions of CO and $NO_x$ are known to detrimentally impact air quality. In areas such as Los Angeles and Mexico City, accumulation of $NO_x$ produces photochemical smog. Normally associated with an undesirable haze, the high level of NOx in smog also exacerbates certain health problems such as asthma.

The current invention advances the state of the art by providing a system and process for continuously removing $NO_x$ and other pollutants such as carbon monoxide from a gas stream. The current invention is suitable for use with manufacturing processes and internal combustion engines. Further, by extending catalyst life and eliminating the need for redundant pollution treatment systems, the current invention reduces pollution control costs.

SUMMARY OF THE INVENTION

The current invention provides a system for removing pollutants from a gaseous mixture. The system comprises a reactor containing at least one catalyst and at least one form of sorbent material. Catalysts suitable for use in the current invention have the ability to convert gaseous pollutants to a more desirable material. Typically, the catalysts oxidize the pollutants. Positioned downstream and optionally intermingled with the catalyst bed is the sorbent material in the form of a fluidizable bed. The sorbent removes at least a portion of the catalytic reaction products from the gas stream by either absorbing, adsorbing or reacting with the products. The reactor also includes means for removing saturated or spent sorbent and means for adding fresh sorbent to the reactor without interrupting gas flow. Additionally, the system provides a means for regenerating the saturated or spent sorbent and returning the regenerated sorbent to the reactor.

Further, the current invention provides a system designed to remove NO, $NO_2$ and CO from a gaseous mixture. The system provides a reactor containing at least one catalyst and at least one sorbent material. The catalysts used in the current invention are selected for their ability to convert NO and CO to $NO_2$ and $CO_2$. Positioned downstream and optionally intermingled with the catalyst bed is the sorbent material in the form of a fluidizable bed. The sorbent provides the ability to remove $NO_2$ from the gas stream. The reactor also includes means for removing saturated or spent sorbent and means for adding fresh sorbent to the reactor without interrupting gas flow or the catalytic reaction. Additionally, the system provides a means for regenerating the saturated or spent sorbent and returning the regenerated sorbent to the reactor. Preferably, the removal and return of sorbent takes place without interrupting the gas flow or catalytic reaction.

Additionally, the current invention provides a process for lowering the concentration of pollutants in a gaseous mixture. The process passes the pollutant containing gas through a reactor containing at least one catalyst. The gas contacts the catalyst under conditions sufficient to catalytically oxidize the pollutants. Following catalytic oxidation, the gas enters a fluidizable bed of sorbent material at a flow rate sufficient to fluidize the sorbent. The fluidized sorbent bed removes at least a portion of the oxidized pollutants from the gaseous mixture. The substantially pollutant free gas stream then exits the reactor. The process also conserves resources by removing spent sorbent from the reactor and subsequently regenerating the sorbent. Following regeneration, the sorbent is returned to the reactor. Preferably, the steps of removing spent sorbent and returning regenerated sorbent to the reactor occur without interruption of the overall process. If necessary, new sorbent is added to the reactor to replace any sorbent lost during the regeneration process.

Finally, the current invention also provides a method for removing NO from a gaseous mixture. The method of the current invention contacts a gaseous mixture containing NO with a catalyst under conditions suitable to convert the NO to $NO_2$. Following catalytic conversion of NO to $NO_2$, the gaseous mixture contacts a bed of fluidizable sorbent. The sorbent removes at least a portion of the $NO_2$ from the gaseous mixture. Additionally, the method of the current invention provides for the removal of spent sorbent and addition of fresh sorbent without interruption of the catalytic conversion reaction or flow of gases. Further, the method provides for regeneration of spent sorbent for reuse in the same process.

DETAILED DESCRIPTION OF THE PREFERRED EMBODIMENTS OF THE CURRENT INVENTION

A. System for Reducing Gaseous Pollutants

The current invention provides a system for removing pollutants from gases generated by industrial processes and internal combustion engines. To increase catalyst life and reduce system downtime, the current invention preferably utilizes separate phases of catalyst and sorbent which may be replaced independently of one another. The system will be described in detail with reference to FIGS. 1 and 2. The figures are not necessarily to scale as certain portions may be enlarged to aid in an understanding of the current invention. For the purposes of this disclosure, the term "downstream" indicates the flow of gas through reactor 12 from inlet port 14 to exhaust port 16.

Figure 1:
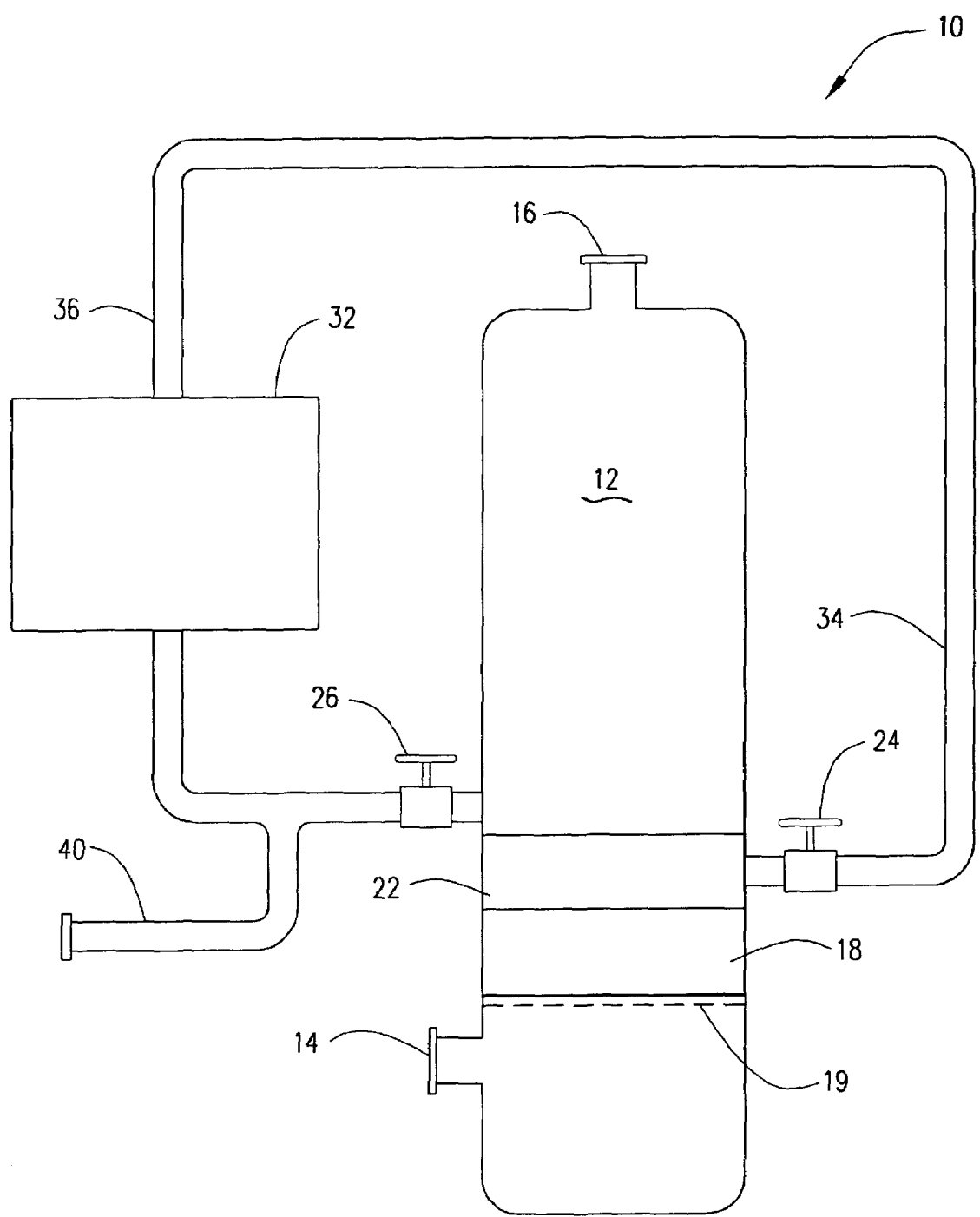
FIG. 1 depicts one embodiment of the current invention.

As depicted in FIG. 1, system 10 comprises a reactor 12 having at least one inlet port and at least one exhaust port, 14 and 16 respectively. The size, location and configurations of ports 14 and 16 will vary depending on the source of the pollutants. Downstream of inlet port 14 is catalyst bed 18. Preferably, catalyst bed 18 is a fixed bed of catalyst on an alumina or other suitable support. Alternatively, catalyst bed 18 is in the form of discrete particles having a density and size sufficient to preclude fluidization of the particles under normal operating conditions. Preferably, catalyst bed 18 has a depth between about 0.1 and about 0.5 meters.

A non-limiting list of catalysts suitable for use in the current invention would include: $TiO_2$, zeolites and alumina with platinum or platinum group metals. In general, the catalyst must be capable of converting the pollutants to more desirable compounds. Preferably, the catalyst oxidizes the pollutants. In the case of NO and CO, the catalytic reaction yields $NO_2$ and $CO_2$. The preferred catalyst consists of spherical alumina pellets having a high surface area coated with 0.5% platinum and ranging in size from about 3 mm to about 4 mm. Preferably, the pellets have a surface area greater than 80 $m^2$/gram. However, any other catalyst support such as calcined $TiO_2$ or zeolites would also be suitable. Other platinum group metals besides platinum may also be suitable. Catalyst bed 18 is retained within reaction chamber 12 on a distribution plate or diffuser 19. Distribution plate 19 creates a sufficient pressure drop to ensure even gas distribution across catalyst bed 18.

Downstream of or optionally intermingled in whole or in part with catalyst bed 18 is a fluidizable sorbent bed 22. Preferably, where intermingled in whole or in part with the catalyst particles in bed 18, the sorbent material is small enough to fit within the interstices of the catalyst particles and still become fluidized within this space. Material suitable for use as the sorbent will in either case have a density and particle size suitable to permit fluidization of the bed under normal operating conditions. Catalyst bed 18 may optionally act as a diffuser to evenly distribute the gas through sorbent bed 22 thereby ensuring complete fluidization of the bed. However, distribution plate 19, commonly used to support catalyst 18 within reaction chamber 12, also ensures an even distribution of gas through catalyst 18 and sorbent bed 22. When the system is not in operation, sorbent bed 22 is supported by catalyst bed 18 and/or distribution plate 19. During operation, the total height of catalyst bed 18 and fluidized sorbent bed 22 is typically between about 1 and about 2 meters. Preferably, the region of reaction chamber 12 housing catalyst bed 18 and fluidized sorbent bed 22 is insulated to help maintain the gas temperature in the range of about 149° to about 204° C. (about 300° to about 400° F.). Further, the overall length of reaction chamber 12 should be sufficient to preclude significant blowover losses of fluidized sorbent bed 22 components with the gas exiting through exhaust port 16.

Figure 2:
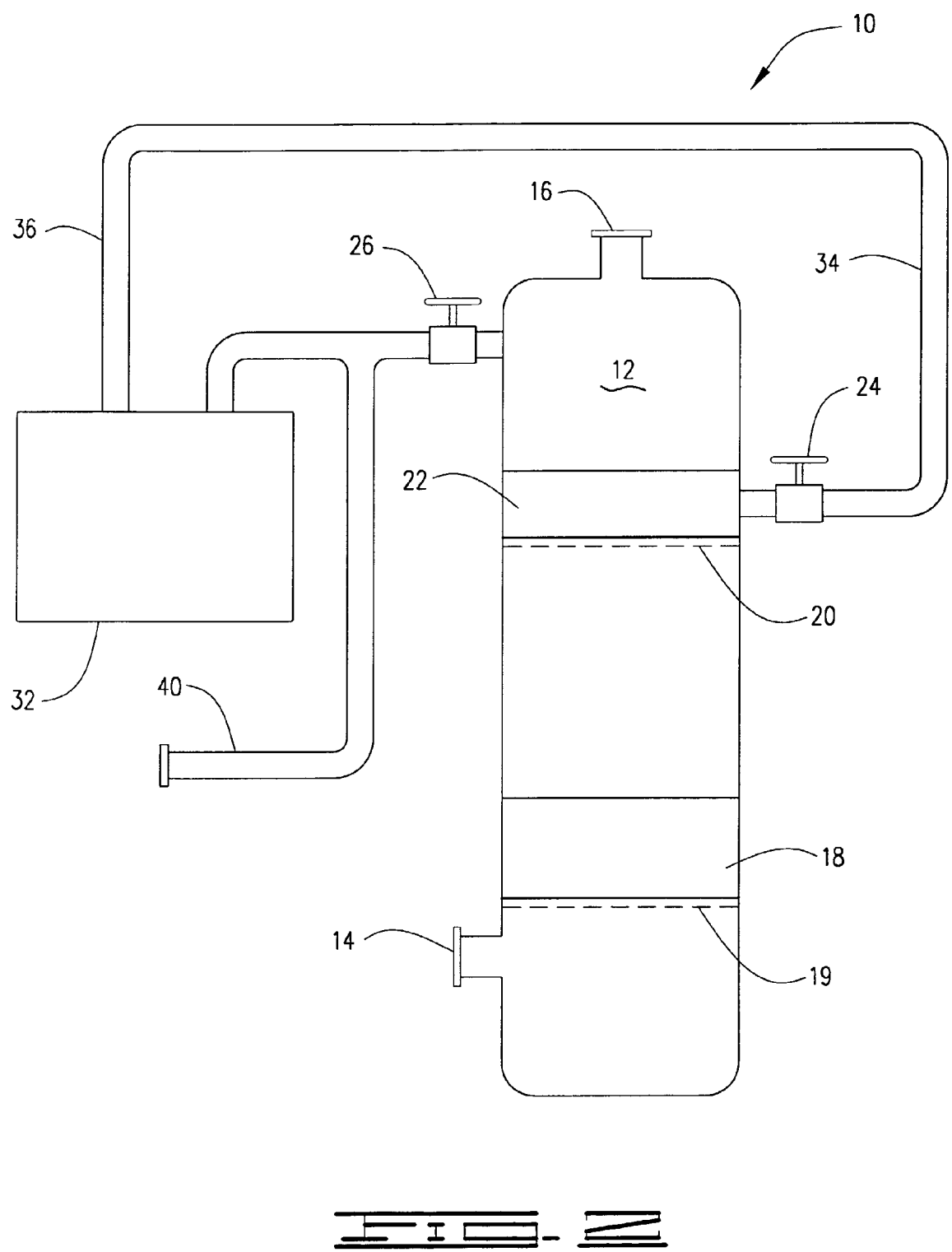
FIG. 2. depicts another embodiment of the current invention.

The current invention also contemplates other physical arrangements of sorbent bed 22 and catalyst bed 18. For example, certain sorbents may perform better at operating temperatures outside the optimum catalyst temperature range. In such instances, fluidizable sorbent bed 22 should be positioned a suitable distance from catalyst bed 18 to permit correction of the temperature to the desired range. FIG. 2 demonstrates the use of an additional distribution plate 20 to provide the necessary separation of sorbent bed 22 and catalyst bed 18. As shown, distribution plate 20, positioned a distance downstream from catalyst bed 18, provides support for sorbent bed 22 when system 10 is not in operation and ensures even distribution of the gas through sorbent bed 22 during operation of system 10.

Sorbent material suitable for use in the current invention includes, but is not limited to, calcium carbonate, potassium carbonate, sodium carbonate, lithium carbonate and magnesium carbonate and mixtures thereof. In general, any sorbent capable of either absorbing, adsorbing or reacting with the catalytically converted pollutants should perform satisfactorily in the current invention. The preferred sorbent is potassium carbonate.

Regardless of the positioning of sorbent bed 22, at least one valve 24 is located within the region occupied by sorbent bed 22. Preferably, valve 24 is positioned in the lower portion of the region occupied by sorbent bed 22. Valve 24 provides fluid communication between the interior and exterior of reactor 12. Thus, valve 24 provides the means for removing spent sorbent from reactor 12. Located downstream of sorbent bed 22 is at least one additional valve 26. Preferably, valve 26 is positioned at a point downstream of the greatest fluidization point of sorbent bed 22. Valve 26 also provides fluid communication between the interior and exterior of reactor 12. During operation of reactor 12, valve 26 also provides the means for adding new or regenerated sorbent to the interior of reactor 12.

To permit continued, uninterrupted operation, system 10 includes a regeneration unit 32. Regeneration unit 32 provides the means for regenerating spent sorbent. Valve 24 and line 34 provide the means for removing spent sorbent removed from reactor and transporting it to regeneration unit 32. Following regeneration, valve 26 and line 36 provide the means for returning the regenerated sorbent to reactor 12. Additional fresh sorbent may be required from time to time to replace sorbent not suitable for regeneration or lost due to attrition and carryover. Line 40, connected to line 36 provides the means for injecting fresh sorbent into reactor 12.

B. Process for Removing CO and $NO_x$ from a Gas

The current invention provides a process for removing pollutants from gas streams generated by industrial processes and internal combustion engines. The process will be described with continued reference to the drawings.

As shown in FIG. 1, a gas stream containing pollutants such as $NO_x$ and CO enters reactor 12 through port 14. Once in reactor 12, the gas contacts catalyst bed 18. Preferably, the gas stream contacts catalyst bed 18 at a temperature sufficient to catalytically convert the pollutants to a more desirable form suitable for absorption/adsorption or reaction with sorbent 22. Typically, the catalytic reaction oxidizes the pollutants.

As known to those skilled in the art, the temperature necessary for the catalytic reaction will vary depending on the nature of the catalyst, the flow rate and other physical variables. In general, the temperature will preferably range from about 126° to about 243° C. (about 260° to about 470° F.). More preferably, the gas will contact the catalyst at a temperature of about 149° to about 204° C. (about 300° to about 400° F.). The inlet pressure will vary depending on the configuration of the reactor. Contact time with fixed catalyst bed 18 should be sufficient to catalytically convert substantially all of the pollutants to the desired materials. Thus, the physical dimensions of catalyst bed 18 will vary with the intended flow rate of the gas. In general, the depth of catalyst bed 18 may range from about 0.1 meters to about 0.5 meters.

Following the catalytic reaction, the gas, now containing catalytic reaction products, such as $NO_2$ and $CO_2$, enters a bed of fluidizable sorbent 22. Preferably, the gas enters sorbent bed 22 at a velocity sufficient to fluidize sorbent bed 22. Velocites of about 0.15 m/s and about 0.91 m/s (0.5 feet/sec to about 3 feet/sec) will normally fluidize sorbent bed 22. Preferably the velocity is between about 0.3 m/s and about 0.61 m/s (about 1 foot/sec and about 2 feet/sec). Sorbent bed 22 should contain a volume sufficient to ensure a contact time of about 0.5 to about 2 seconds with the flowing gas. When fluidized, total bed depth of catalyst bed 18 and sorbent bed 22 may range from about 1 meter to about 2 meters.

Sorbent material suitable for use in the current invention includes but is not limited to calcium carbonate, lithium carbonate, potassium carbonate, sodium carbonate, magnesium carbonate and mixtures thereof. The preferred sorbent material is granulated potassium carbonate having a particle size of about 20 mesh to about 40 mesh. Normally, the sorbent is chosen for its ability to react with $NO_2$ as the $CO_2$ will generally be allowed to exit the system through port 16.

As the sorbent is consumed, the spent sorbent or resulting reaction products can be drained from the reactor through valve 24. To maintain the continuous removal of pollutants from the gas, fresh or regenerated sorbent is added to the reactor through valve 26. Preferably, removal and replacement of sorbent material from sorbent bed 22 takes place without interrupting the catalytic reaction.

The spent sorbent may pass from reactor 12 through line 34 to a waste receptacle, not shown. More preferably the sorbent passes to regeneration unit 32. The specific regeneration process depends on the sorbent used. If the sorbent reacted with the catalytic reaction products then a subsequent reaction can be designed to regenerate the sorbent allowing for its subsequent return to reactor 12.

Once in the regeneration unit, the regeneration process will be dictated by the nature of the original sorbent. If a potassium carbonate sorbent has reacted with $NO_2$, then the following reaction describes the regeneration process:

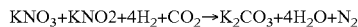

$$KNO_3 + KNO2 + 4H_2 + CO_2 \rightarrow K_2CO_3 + 4H_2O + N_2$$

The products of the regeneration reaction are potassium carbonate, water and nitrogen gas. The water and nitrogen gas are exhausted through a port, not shown, and the potassium carbonate returned to reactor 12 through line 36 and valve 26. Preferably, the regeneration process recovers at least 90% of the sorbent material.

Typically, the regeneration process takes place in a fluidized bed at temperatures up to about 660° C. and at a gas velocity of about 0.15 m/s and about 0.91 m/s (0.5 feet/sec to about 3 feet/sec). Preferably, the velocity is between about 0.3 m/s and about 0.61 m/s (about 1 foot/sec and about 2 feet/sec).

To further explain the process of the current invention, the removal of $NO_x$ from a gas stream will be described in detail. The source of the polluted gas stream is not critical to the current invention.

As shown in FIG. 1, a gas stream containing $NO_x$ will enter reactor 12 through port 14. Preferably, the gas stream contacts catalyst bed 18 at a temperature sufficient to catalytically convert substantially all nitric oxide (NO) to nitrogen dioxide ($NO_2$). The temperature necessary for the catalytic reaction will vary depending on the catalyst used. The typical operating temperature will be in the range of about 126° to about 243° C. (about 260° to about 470° F.).

Following the catalytic reaction, the nitrogen dioxide containing gas passes through sorbent bed 22 at a velocity between about 1 ft/sec and about 3 ft/sec. When using potassium carbonate as the sorbent, the following reaction describes the removal of $NO_2$ from the gas stream:

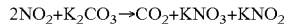

$$2NO_2 + K_2CO_3 \rightarrow CO_2 + KNO_3 + KNO_2$$

As indicated by the above equation, the nitrogen dioxide reacts with the sorbent forming potassium nitrate, potassium nitrite and carbon dioxide. Other than carbon dioxide, the reaction products of the above equation have a density sufficient to preclude passage out of reactor 12 with the flowing gas. Thus, the gas leaving reactor 14 through exhaust port 16 contains a significantly lower concentration of $NO_x$. Preferably, at least 90% of the $NO_2$ is removed from the gas stream by the fluidized sorbent bed 22. More preferably, the gas is substantially free of $NO_x$. As the sorbent in fluidized sorbent bed 22 is consumed, the efficiency of sorbent bed 22 decreases to the point where the spent sorbent must be removed from reactor 12 through valve 24. To maintain the continuous removal of $NO_x$ from the gas, fresh or regenerated sorbent is added to the reactor through lines 36 or 40 and valve 26.

The following examples are provided merely to aid in the understanding of the current invention and should not be interpreted as limiting the scope of the attached claims.

EXAMPLE 1

A gas stream containing 2000 ppm of $NO_x$ was passed through a reactor containing 1.8 kg (4 pounds) of bead catalyst and 61 cm (24 inches) of $K_2CO_3$. The catalyst, 0.5% Pt on 3.2 mm alumina pellets, has a surface area of 90 m²/g and 0.5% Pt by weight and is commercially available from Aldrich. The superficial bed velocity was 0.61 m/sec (2 ft/sec) and the gas temperature was 232° C. (450° F.). Analysis of the off-gas indicated no measurable $NO_x$.

EXAMPLE 2

A gas stream containing 250–300 ppm of $NO_x$ was passed through an off the shelf automotive catalytic converter at a temperature of 127° C. (260° F.) to convert the NO to $NO_2$. After further heating to 193° C. (380° F.), the gas was passed through a reactor containing 0.9 kg (2 lb.) of the catalyst used in Example 1. The NO concentration of the off gas was 0 ppm, the $NO_2$ concentration was 4–5 ppm. Thus, this example demonstrates the complete catalytic oxidation of NO to $NO_2$.

The present invention has been described in detail with reference to FIGS. 1 and 2 and the examples, but other embodiments of the system and processes for performing the current invention will be apparent to those skilled in the art. Thus, the foregoing specification is considered exemplary with the true scope and spirit of the invention being indicated by the following claims.

What is claimed is:

1. A process for lowering the concentration of pollutants in a gaseous mixture, comprising the steps of:
   contacting a catalyst with a gaseous mixture containing pollutants under conditions sufficient to lower the concentration of pollutants in the gaseous mixture, by catalytically converting at least a portion of said pollutants to at least one different material, said different material remaining in the gaseous mixture;
   subsequently passing the gaseous mixture through a fluidizable sorbent bed at a flow rate sufficient to fluidize said fluidizable sorbent, under conditions which are suitable for removing at least a portion of said different material from the gaseous mixture;
   removing spent sorbent from contact with said gaseous mixture; and,
   adding fresh sorbent in place of the spent sorbent so removed, wherein removal and replacement of said sorbent occurs without interrupting the flow of said gaseous mixture to said fluidizable sorbent bed.

2. The process of claim 1, further comprising the step of regenerating said spent sorbent from said fluidizable sorbent bed and following said step of regenerating returning said sorbent to contact with said gaseous mixture as fresh sorbent.

3. The process of claim 1, wherein said step of catalytically converting said pollutant to at least one different material is a catalytic oxidation step.

4. The process of claim 1, wherein said fluidizable sorbent is selected from the group consisting of metal carbonates.

5. The process of claim 1, wherein said catalyst is selected from the group consisting of alumina with platinum or platinum group metals, TiO2, zeolites and combinations thereof.

6. The process of claim 1, wherein said sorbent is selected from the group consisting of potassium carbonate, calcium carbonate, lithium carbonate, sodium carbonate, magnesium carbonate and mixtures thereof.

7. The process of claim 1, wherein said steps of removing and adding sorbent take place without stopping the catalytic conversion of said pollutants.

8. A process for lowering the concentration of a pollutant in a gaseous mixture, comprising the steps of:
contacting a gaseous mixture with a fixed bed catalyst under conditions sufficient to lower the concentration of pollutant in the gaseous mixture, by catalytically converting the pollutant to at least one different material, said different material remaining in the gaseous mixture;
subsequently contacting the gaseous mixture with a fluidizable sorbent bed at a flow rate sufficient to fluidize said fluidizable sorbent, under conditions which are suitable for removing at least a portion of said different material from the gaseous mixture;
removing spent sorbent from contact with said gaseous mixture;
regenerating said spent sorbent; and,
returning said sorbent to contact with said gaseous mixture as fresh sorbent, wherein removal and replacement of said sorbent occurs without interrupting the flow of said gaseous mixture to said fixed bed of catalyst and said fluidizable sorbent bed.

9. The process of claims 8, wherein said pollutant is NO and said different material is $NO_2$.

10. The process of claim 8, wherein said pollutant is CO and said different material is $CO_2$.

11. The process of claim 8, wherein said pollutant is NO and said different material is $NO_2$ and wherein following said regeneration step recovers at least 90% of said fluidizable sorbent.

12. The process of claim 10, wherein said fluidizable sorbent removes at least 90% of $NO_2$ from said gaseous mixture.

13. The process of claim 10, wherein said catalyst is selected from the group consisting of alumina with platinum or platinum group metals, Ti $O_2$, zeolites and combinations thereof.

14. A process for lowering the concentration of NO in a gaseous mixture, comprising the steps of:
contacting the gaseous mixture containing NO with a fixed bed catalyst under conditions sufficient to lower the concentration of NO in the gaseous mixture, by catalytically converting the pollutant to $NO_2$;
subsequently contacting a fluidizable sorbent bed with said gaseous mixture at flow rate sufficient to fluidize said fluidizable sorbent, under conditions which are suitable for removing at least a portion of said $NO_2$ from the gaseous mixture;
during the performance of the catalytic conversion, removing spent sorbent from contact with said gaseous mixture and, adding fresh sorbent in place of the spent sorbent so removed without interrupting the flow of said gaseous mixture to said fixed bed of catalyst and said fluidizable sorbent bed.

15. The process of claim 14, further comprising the steps of regenerating said spent sorbent from said fluidizable sorbent bed and following said step of regenerating said spent sorbent, returning said sorbent to said fluidizable sorbent bed and to contact with said gaseous mixture as fresh sorbent without interrupting the flow of said gaseous mixture to said fixed bed of catalyst and said fluidizable sorbent.

16. The system of claim 14, wherein said sorbent is selected from the group consisting of potassium carbonate, calcium carbonate, lithium carbonate, sodium carbonate, magnesium carbonate and mixtures thereof.

17. The process of claim 14, wherein said fluidizable sorbent removes at least 90% of said $NO_2$ from said gaseous mixture.

18. The process of claim 15, wherein following said regeneration step recovers at least 90% of said fluidizable sorbent.

19. The process of claim 14, wherein said catalyst is selected from the group consisting of alumina with platinum or platinum group metals, Ti $O_2$, zeolites and combinations thereof.

* * * * *